United States Patent
Littrell

Patent Number: 5,820,030
Date of Patent: Oct. 13, 1998

[54] SOAP MARKER FOAMING DROP TUBE

[76] Inventor: John B. Littrell, Rte. 1 Box 271, Trenton, Tex. 75490

[21] Appl. No.: 362,938

[22] Filed: Aug. 25, 1995

[51] Int. Cl.⁶ .................................................. B05B 1/14
[52] U.S. Cl. ........................................ 239/553.3; 239/172
[58] Field of Search ................... 239/172, 146, 239/553.3, 553, 553.5, 590–590.5, 567, 602; 47/1.5; 111/25, 33; 116/209; 172/126

[56] References Cited

U.S. PATENT DOCUMENTS

| | | | |
|---|---|---|---|
| 670,234 | 3/1901 | Hughen | 239/567 X |
| 1,278,636 | 9/1918 | Green | 239/567 X |
| 2,199,421 | 5/1940 | Stevens, Jr. | 239/172 X |
| 2,515,600 | 8/1950 | Hayes | 239/553.3 X |
| 2,651,546 | 9/1953 | Palm | 239/602 X |
| 3,083,913 | 4/1963 | Coffman et al. | 239/150 |
| 3,211,381 | 10/1965 | Rasmussen | 239/172 X |
| 3,339,843 | 9/1967 | Horton | 239/172 X |
| 3,388,868 | 6/1968 | Watson et al. | 239/553.3 |
| 3,446,285 | 5/1969 | Hout | 239/553.3 X |
| 3,481,545 | 12/1969 | Cooke et al. | 111/33 X |
| 3,601,320 | 8/1971 | Du Plessis | 239/553.3 X |
| 3,604,630 | 9/1971 | Conti | 239/553.3 X |
| 4,165,834 | 8/1979 | Pitchon et al. | 111/33 X |
| 4,667,882 | 5/1987 | Pacifici | 239/590.5 X |
| 5,031,834 | 7/1991 | Simpson | 239/172 |
| 5,133,500 | 7/1992 | Simpson | 239/172 |

FOREIGN PATENT DOCUMENTS

| | | | |
|---|---|---|---|
| 5-176605 | 7/1993 | Japan | 172/126 |
| 673256 | 7/1979 | U.S.S.R. | 239/172 |
| 782734 | 11/1980 | U.S.S.R. | 239/172 |
| 1007571 | 3/1983 | U.S.S.R. | 172/126 |
| 1147257 | 3/1985 | U.S.S.R. | 172/126 |
| 2116013 | 9/1983 | United Kingdom | 172/126 |

OTHER PUBLICATIONS

"Field Mark" Foam Marker, The Best of Farm Show Supplemental issue, p. 37, 1985.

*Primary Examiner*—Lesley D. Morris

[57] ABSTRACT

The apparatus consist of an inner perforated cap attached to a long flexible perforated tubing. When a mixture of soap, air and water are forced through the apparatus an enormous amount of soap foam forms on the outside of the tubing. Since the foam is forming from top to bottom, it will mark tall residue as well as the ground.

3 Claims, 3 Drawing Sheets

SOAP MARKER FOAMING DROP TUBE

BACKGROUND OF THE INVENTION

The present invention relates to the drop tube on soap markers used to mark the swath width of fertilizer and spraying equipment used in the agricultural industry. Spray booms are getting wider with some over 100 ft. Government regulations on highly erodible land coupled with the Conservation Reserve Program has Applicators searching for their soap that has fallen below the top of residue. This leads to skips in coverage and overlapping which is costly and harmful to the enviroment and the crop. With the old style drop tube the only way to get above the residue canopy was to raise the boom which screwed up the spray pattern.

With the new style drop tube, where there is no residue, the soap drops off the end of the tube same as the old style, except bigger blobs. When there is tall residue, the soap dislodges from the outside of the tube when it comes in contact with the vegetation, thus marking it for easy sight. Some fields have plant growth from bare dirt to over 6 ft. The invention works on all applications without adjustment.

DESCRIPTION OF PRIOR ART

Old style drop tubes consist of a solid flexible hose that drops down from the end of a spray boom and has a cup at the end of the hose that has a plastic sponge, similar to a kitchen scrubber, wired into it. The soap forms at the bottom of the cup only.

SUMMARY OF THE INVENTION

It is the object of this invention to provide a single foam drop tube that will work for any application. It will provide less wind drift, make bigger, longer lasting soap blobs, mark tall residue, use less soap and increase applicator accuracy.

BRIEF DESCRIPTION OF THE DRAWING

The present invention will be more fully understood by reference to the following detailed description thereof when read in conjunction with the attached drawing, and wherein.

DETAILED DESCRIPTION

Figure 1:
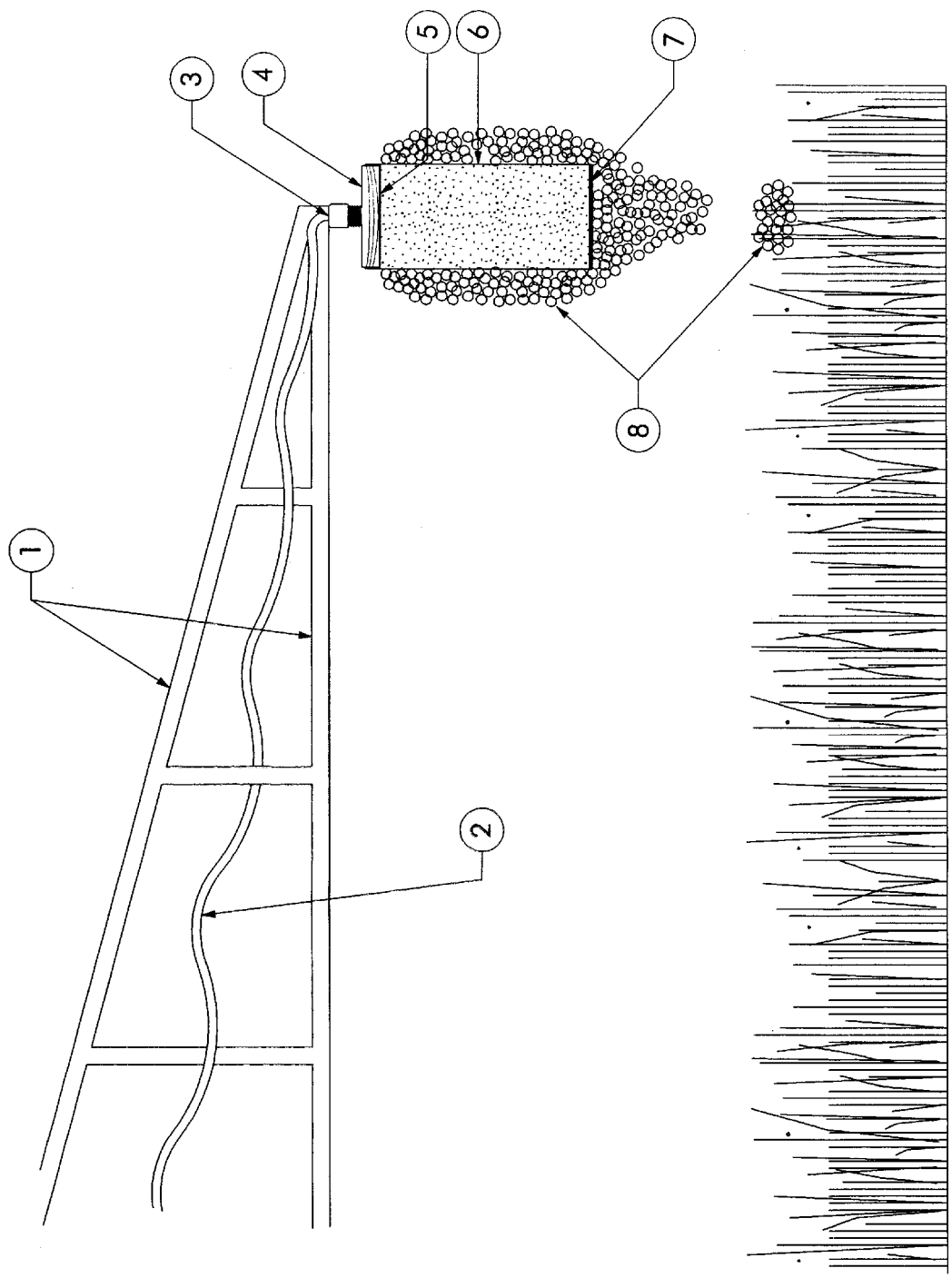
FIG. 1 is a rearview of approximately 10 ft. of the end of a spray boom with drop tube attached.
Figure 2:
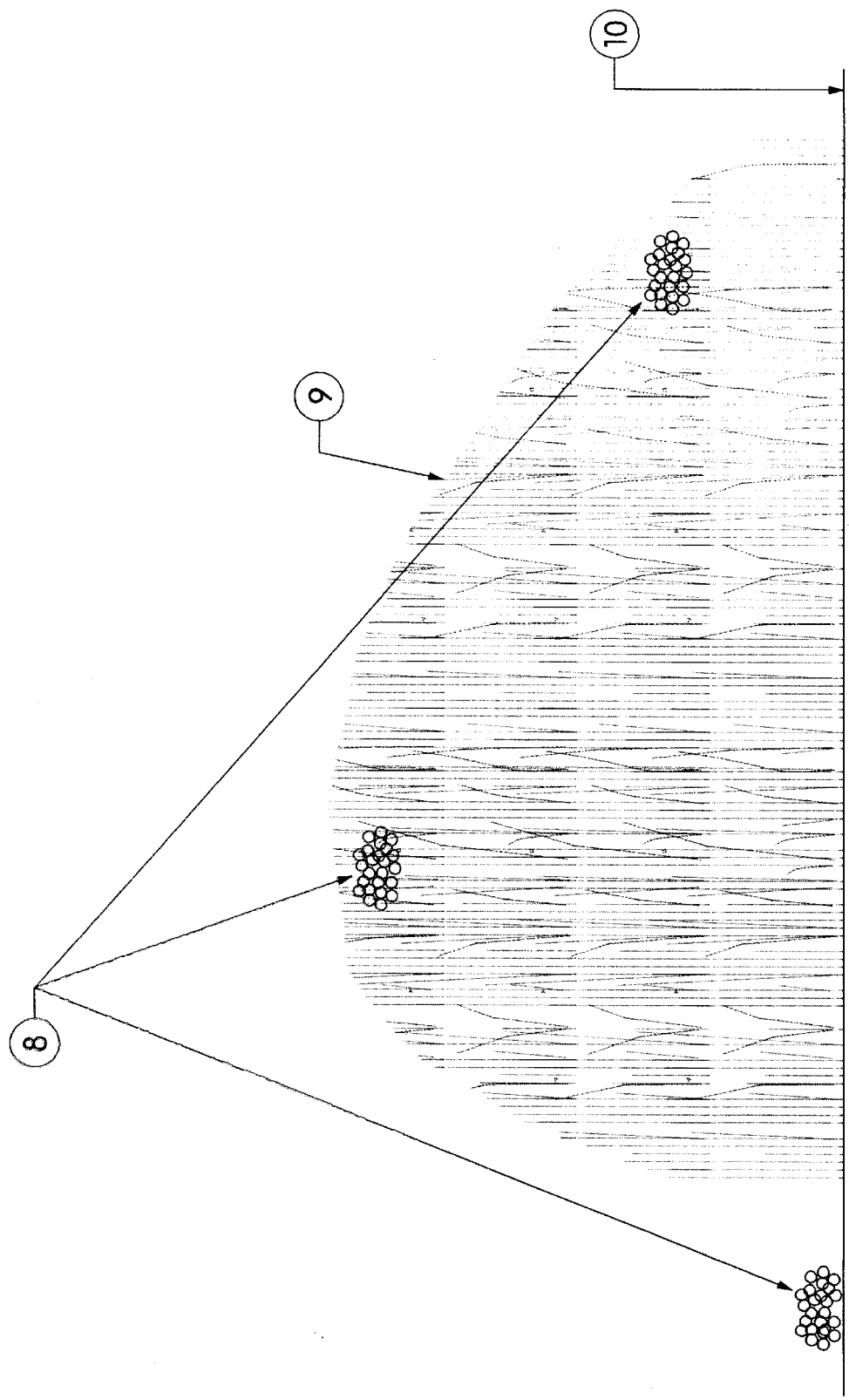
FIG. 2 is an example of a field where boom is used, for application understanding only.
Figure 3:
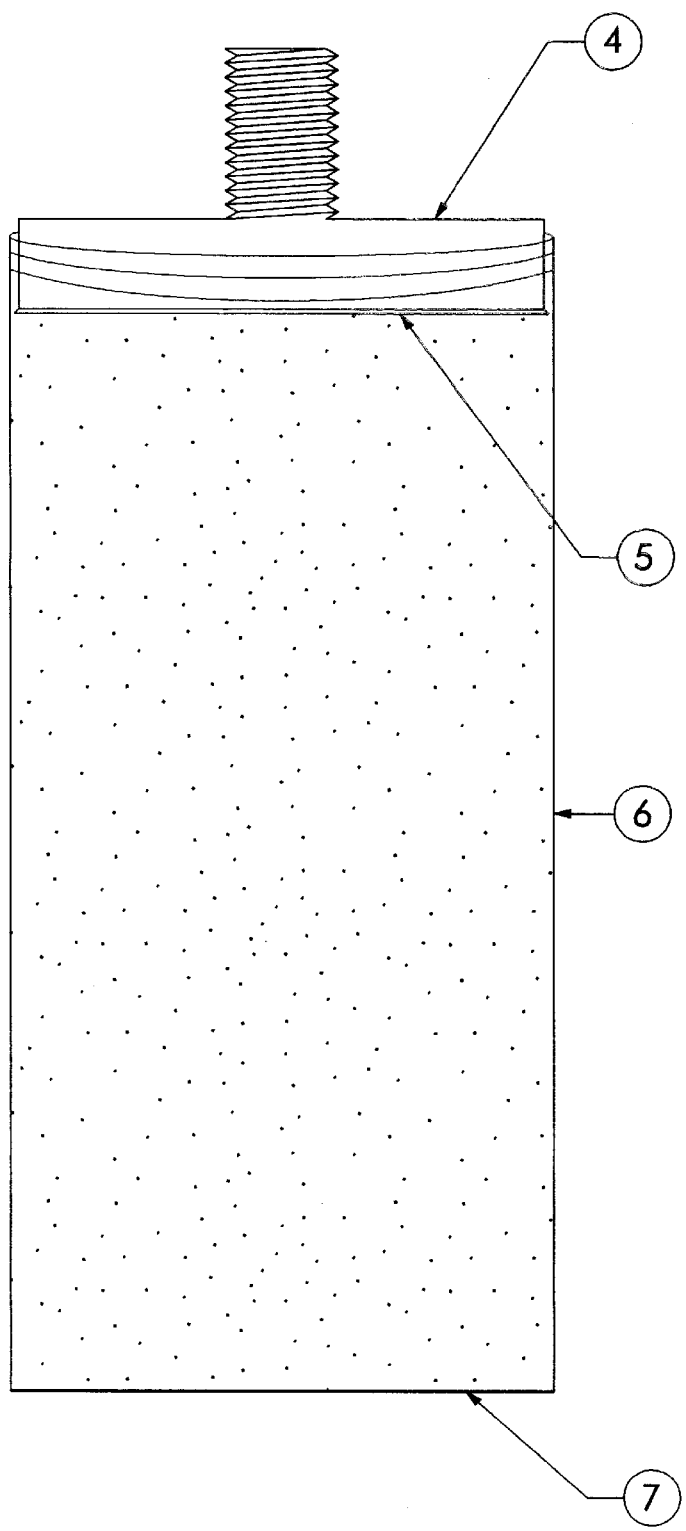
FIG. 3. shows an elevation view of a drop tube of the instant invention.

Mounted on the end of a spray boom 1 for making the pathway are soap foaming drop tubes. These tubes are lengths of perforated flexible tubing 6 closed at one end 7 by a wall while the other end is closed off by a perforated pug 5 attached to a hose barb 4. Each hose barb 4 attaches to a connector and hose barb adapter 3 mounted to a hose 2 leading from a mixing chamber. Once a soap, air and water mixture are delivered via the hose 2 to the drop tubes, a foaming action starts as the mixture passes into tubing 6 through the perforated plug 5. The closed ends force the soap foam 8 to flow from the tubes through the perforations all along the length of the tubes. This results in an increased foaming action occurring on the entire surface of the tubes instead of the bottom of a cup as in the prior art. The soap foam works its way down each tube and drops to the ground 10 or clings to weeds, grass or crops 9. This device will allow soap marks to be placed from ground level to the highest point of the tubes 4 without a need for adjustment.

I claim:

1. A soap marker foaming drop tube comprising:

A plexible tube having perforations along an entire length thereof having one end closed off by a wall, and a perforated plug closing off another end and attached to a hose barb for attaching to a hose barb adapter and connector on a supply hose from a mixing chamber such that upon delivery of a soap, air and water mixture via the supply hose, a foaming action will occur that will cause foam to exit the tube via the perforations along the length to allow soap markings to be deposited on a surface, either by touching the surface or falling to the surface.

2. The soap foaming drop tube according to claim 1 wherein the tube is flexible and has a constant diameter from end to end so that it will bend and slide over obstructions without snagging.

3. The soap foaming drop tube according to claim 1 wherein the tube will foam from end to end during usage marking vegetation or the ground without need for adjustment.

* * * * *